(12) United States Patent
Tkabladze et al.

(10) Patent No.: US 9,268,055 B2
(45) Date of Patent: Feb. 23, 2016

(54) WELL-LOGGING APPARATUS INCLUDING AZIMUTHALLY SPACED RADIATION DETECTORS

(71) Applicant: Schlumberger Technology Corporaton, Sugar Land, TX (US)

(72) Inventors: Avtandil Tkabladze, Sugar Land, TX (US); Michael L. Evans, Missouri City, TX (US); Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 147 days.

(21) Appl. No.: 13/728,937

(22) Filed: Dec. 27, 2012

(65) Prior Publication Data

US 2013/0187035 A1 Jul. 25, 2013

Related U.S. Application Data

(60) Provisional application No. 61/581,724, filed on Dec. 30, 2011.

(51) Int. Cl.
*G01V 5/10* (2006.01)
*G01V 5/08* (2006.01)

(52) U.S. Cl.
CPC ... *G01V 5/08* (2013.01); *G01V 5/10* (2013.01)

(58) Field of Classification Search
CPC .................................. G01V 5/08; G01V 5/10
USPC ....................................................... 250/269.4
See application file for complete search history.

(56) References Cited

U.S. PATENT DOCUMENTS

| | | | |
|---|---|---|---|
| 4,180,730 A * | 12/1979 | Givens et al. | 250/265 |
| 4,879,463 A | 11/1989 | Wraight et al. | |
| 5,539,225 A * | 7/1996 | Loomis et al. | 250/269.4 |
| 7,383,142 B2 | 6/2008 | Scoullar et al. | |
| 7,408,645 B2 | 8/2008 | DiFoggio | |
| 7,544,929 B1 | 6/2009 | Mickael | |
| 7,669,468 B2 | 3/2010 | Wraight et al. | |
| 8,000,899 B2 | 8/2011 | Stoller et al. | |
| 2009/0043509 A1 | 2/2009 | Madigan et al. | |
| 2010/0126770 A1 | 5/2010 | Sugiura | |

(Continued)

FOREIGN PATENT DOCUMENTS

GB 2258040 A 1/1993

OTHER PUBLICATIONS

European Search Report for EP Application No. 12861979.8 dated May 8, 2015, 3 pages.

(Continued)

*Primary Examiner* — David Porta
*Assistant Examiner* — Meenakshi Sahu
(74) *Attorney, Agent, or Firm* — Michael Dae

(57) ABSTRACT

A well-logging device may include a housing to be positioned within a larger borehole of a subterranean formation and thereby define a stand-off distance with respect to the larger borehole. The well-logging device may also include at least one radiation source carried by the housing to direct radiation into the subterranean formation, and radiation detectors carried by the housing in azimuthally spaced relation to detect radiation from the subterranean formation. The well-logging device may further include a controller to cooperate with the radiation detectors to determine at least one property of the subterranean formation corrected for the stand-off distance.

23 Claims, 8 Drawing Sheets

(56) References Cited

U.S. PATENT DOCUMENTS

2010/0187413 A1 7/2010 DiFoggio et al.
2011/0238313 A1* 9/2011 Thornton et al. .............. 702/8
2011/0272570 A1 11/2011 Xu et al.

OTHER PUBLICATIONS

European Examination Report for EP Application No. 12861979.8 dated Jun. 4, 2015, 5 pages.

International Search Report and Written Opinion for International Application No. PCT/US2012/071971 dated Apr. 23, 2013.

Bolozdynya, Alexander, Anatoli Arodzero, and Ray DeVito. "High-pressure xenon detectors for applications in portal safeguard systems and for monitoring nuclear waste." Constellation Technology Corporation, pp. 1-7.

Palmer, R. L., and G. C. Tepper. "Development of a high-pressure xenon ionization chamber gamma-ray spectrometer for field deployment in cone penetrometers." Journal of Radioanalytical and Nuclear Chemistry 248.2 (2001): 289-294.

* cited by examiner

WELL-LOGGING APPARATUS INCLUDING AZIMUTHALLY SPACED RADIATION DETECTORS

RELATED APPLICATION

This application claims the benefit of a related U.S. Provisional Application Ser. No. 61/581,724 filed Dec. 30, 2011, entitled "METHOD FOR COMPENSATING TOOL STANDOFF EFFECTS IN NEUTRON POROSITY MEASUREMENTS THROUGH AZIMUTHAL INFORMATION," the disclosure of which is incorporated by reference herein in its entirety.

BACKGROUND

To determine a porosity of a subterranean formation, it may be desirable to make several simultaneous measurements. One tool for measuring porosity is based on neutron transport through the subterranean formation. The neutron flux attenuated with distance from the source may depend strongly on the hydrogen content of the subterranean formation. For a neutron source, radioisotopic sources or accelerator based sources are used in existing tools.

If pore spaces are filled by liquid, the higher porosity corresponds to a higher hydrogen index. The detected neutron counts are generally lower in this case. A properly calibrated tool may increase the accuracy of the porosity measurement in liquid-filled formations if the matrix composition is known. However, the measurement may be affected by various environmental conditions.

On the other hand, the same measurement may be less accurate for gas-filled subterranean formations when the hydrogen content in the pore spaces is lower due to the relatively low density of the gas. A density measurement may address this ambiguity. For the same porosity of the subterranean formation, the gas-filled and liquid-filled matrix have different densities.

One environmental condition that may affect the porosity measurement is tool position or stand-off in the borehole. The stand-off and the borehole fluid (liquid or gas) may impact the count rate in radiation detectors.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A well-logging apparatus may include a housing to be positioned within a larger borehole of a subterranean formation and thereby define a stand-off distance with respect to the larger borehole. The well-logging apparatus may also include a radiation source carried by the housing to direct radiation into the subterranean formation, and radiation detectors carried by the housing in azimuthally spaced relation to detect radiation from the subterranean formation. A controller may cooperate with the plurality of radiation detectors to determine at least one property of the subterranean formation corrected for the stand-off distance based upon the detected radiation from the radiation detectors.

A method aspect is directed to a method of determining a stand-off distance defined by a housing of a well-logging apparatus to be positioned within a larger borehole of a subterranean formation. The stand-off distance is defined with respect to the larger borehole. The method may include directing radiation from a radiation source carried by the housing into the subterranean formation, and detecting radiation from the subterranean formation using radiation detectors carried by the housing in azimuthally spaced relation. The method may also include using a controller to cooperate with the plurality of radiation detectors and determine at least one property of the subterranean formation corrected for the stand-off distance based upon the detected radiation from the radiation detectors.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to refer to like elements in different embodiments.

Figure 1:
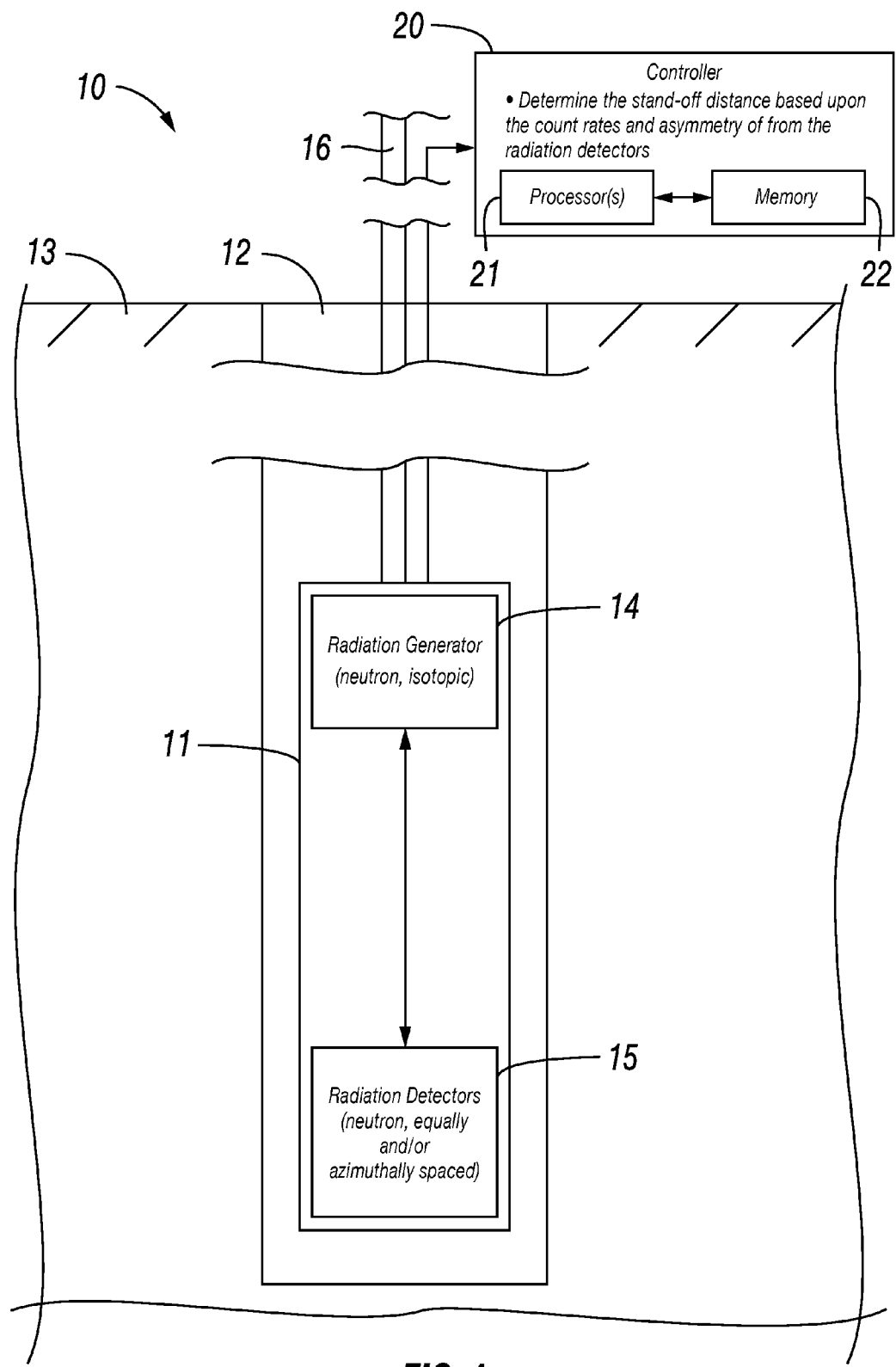
FIG. 1 is a schematic diagram of a subterranean formation including a well-logging apparatus in accordance with an embodiment.
Figure 2:
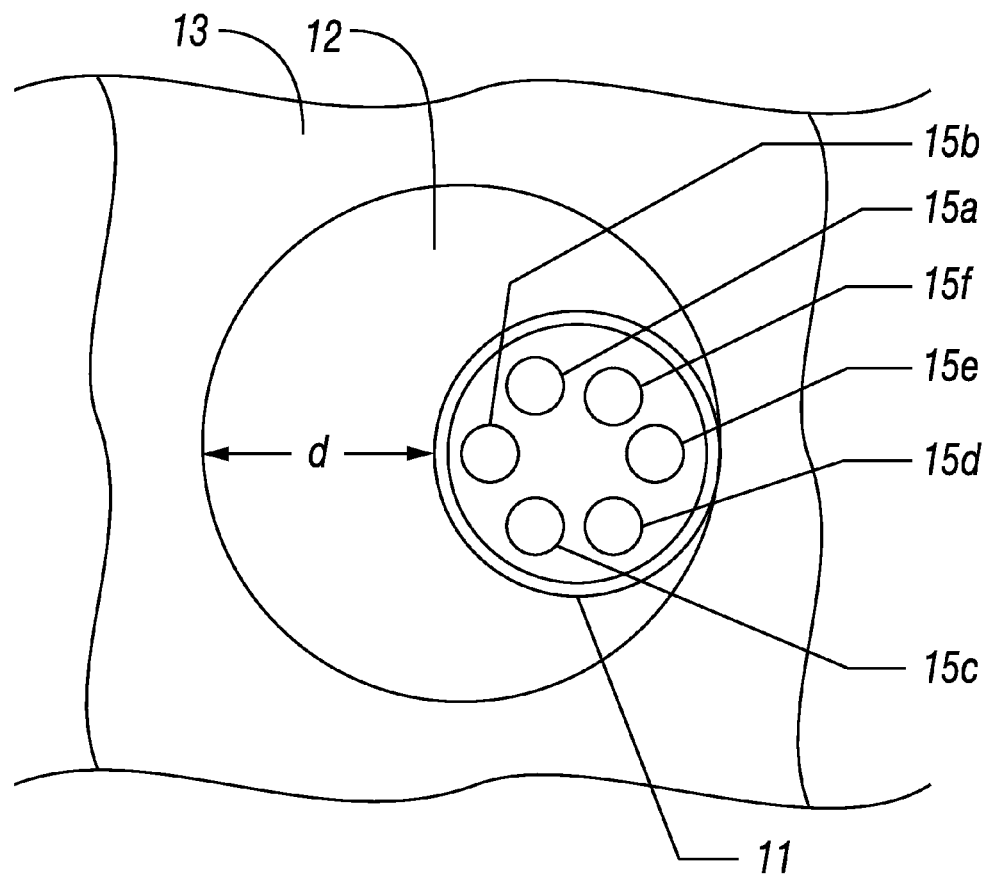
FIG. 2 an enlarged cross-sectional downhole view of a portion of the well-logging apparatus in FIG. 1 adjacent a wall of a borehole.

Referring initially to FIGS. 1 and 2, a well-logging apparatus 10 includes a housing 11 to be positioned within a larger borehole 12 of a subterranean formation 13 and thereby define a stand-off distance d with respect to the larger borehole. The housing 11 illustratively has a rounded shape, but may be another shape. The housing 11 may be coupled to a tether 16 to position the housing in the borehole 12. For example, the tether 16 may be in the form of a wireline, coiled tubing, or a slickline. Of course, the tether 16 may be another type of tether that may use other techniques for conveying the housing 11 within the borehole 12.

A radiation source 14 is carried by the housing 11. The radiation source 14 may be a neutron generator (accelerator based, pulsed), for example, or may be radioisotopic radiation source, such as, for example, $^{241}$AmBe or $^{252}$Cf. Of course, the radiation source 14 may be another type of radiation source. The radiation source 14 directs radiation into the subterranean formation 13.

Radiation detectors 15a-15f are carried by the housing 11 in azimuthally spaced relation to detect radiation from the subterranean formation 13. More particularly, the radiation detectors 15a-15f are equally azimuthally spaced from one another. Of course, in some embodiments, the radiation detectors 15a-15f may not be equally azimuthally spaced. The radiation detectors 15a-15f may be carried by the housing 11 to cover 360-degrees. The radiation detectors 15a-15f generate a count rate of detected neutrons, for example, in the presence of an active neutron source 14. Moreover, while six radiation detectors 15a-15f are illustrated, any number of radiation detectors may be carried by the housing 11.

The radiation detectors 15a-15f may be neutron detectors, for example, when the radiation source 14 is a neutron generator. In some embodiments, the radiation detectors 15a-15f may be epithermal, thermal, or high energy (>100 keV) neutron detectors.

The well-logging tool 10 may advantageously provide increased compensation for stand-off. Porosity, for example, neutron porosity, generally depends on the count rates of each radiation detector. If the count rate is sensitive to the stand-off, the asymmetry of the count rates may provide a measure of stand-off that can be used for correction. If, however, the count rate is not sensitive to the stand-off, for example, when the borehole fluid hydrogen index is low, (e.g. the borehole fluid is methane gas) then the asymmetry is also less sensitive to the stand-off and a small or no correction factor may be applied to the radiation detector reading, for example.

Figure 3:
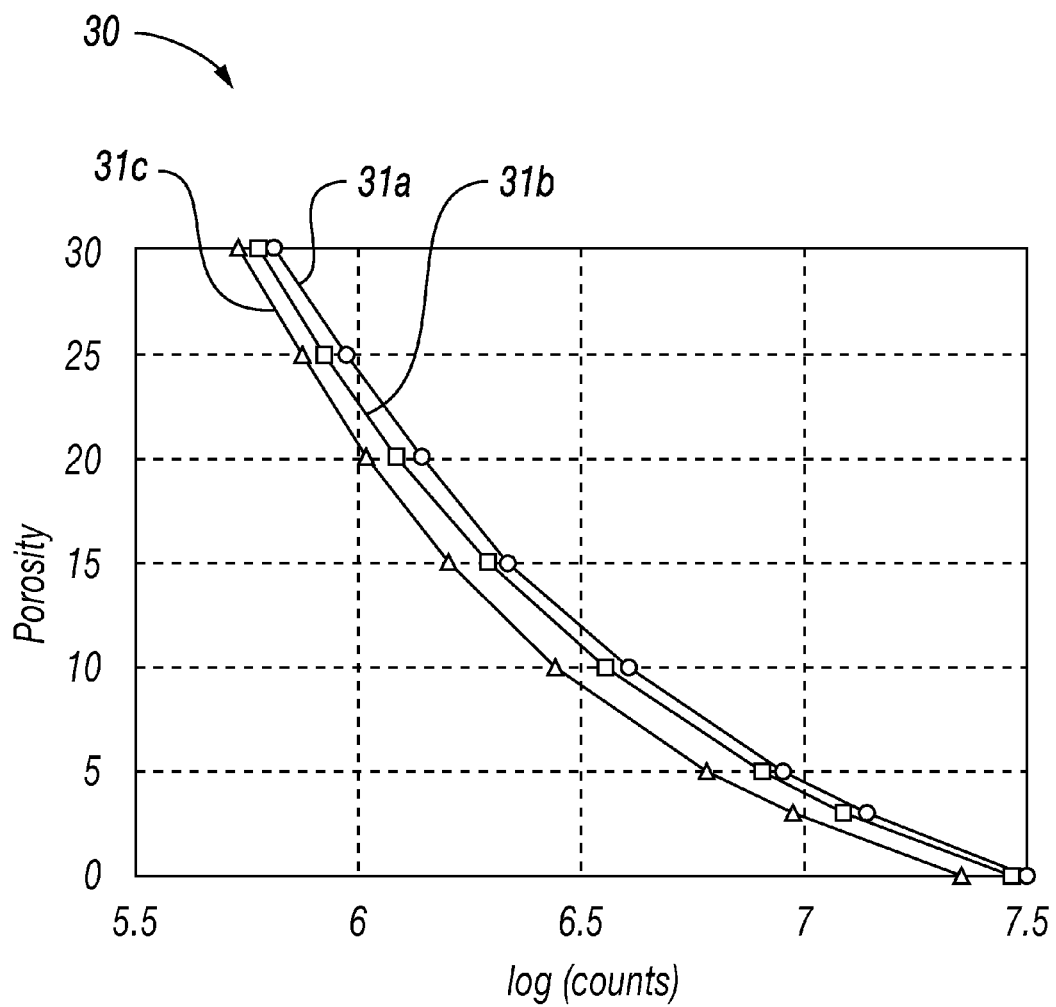
FIG. 3 is a graph of simulated porosity versus radiation detector counts for a water-filled borehole.

Referring additionally to the graph 30 in FIG. 3, the dependence of porosity on the detector count rates is illustrated. A Monte Carlo simulation was performed for a water-filled borehole. The three curves 31a-31c correspond to different stand-offs of the radiation detector. In particular, curve 31a corresponds to no stand-off, while curve 31b corresponds to 0.4 inches of stand-off. Curve 31c corresponds to 0.85 inches of stand-off.

Figure 4:
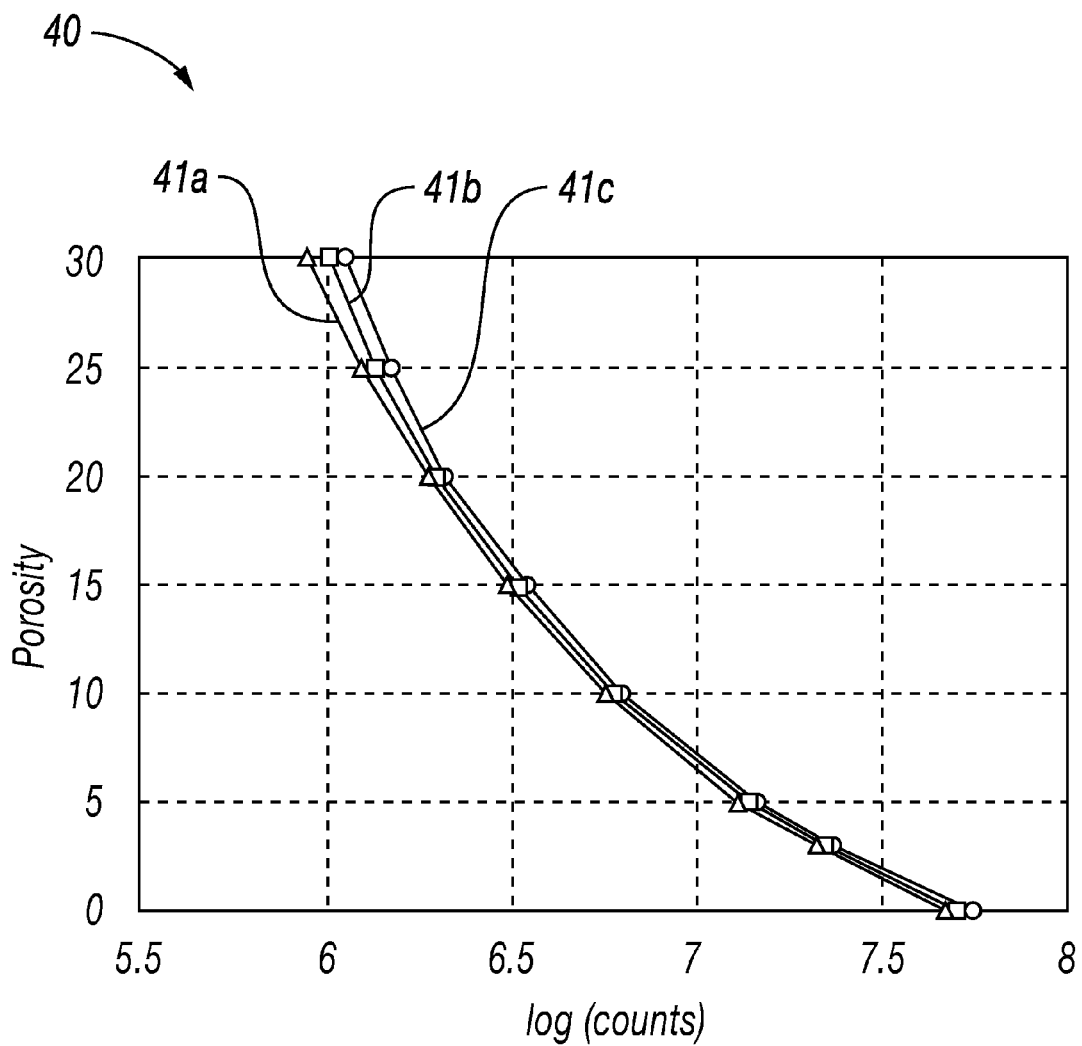
FIG. 4 is a graph of simulated porosity versus radiation detector counts for a methane-filled borehole.

Referring additionally to the graph 40 in FIG. 4, the same dependences are illustrated when the borehole fluid is high density methane, for example. For the modeling it was assumed that methane pressure was 5000 psi, density 0.18 g/cm³, and the hydrogen index 0.5. The data show that for relatively low hydrogen index borehole fluid, stand-off has a reduced affect on the radiation detector reading as compared to a water-filled borehole. Curve 41a corresponds to no stand-off, while curve 41b corresponds to 0.4 inches of stand-off. Curve 41c corresponds to 0.85 inches of stand-off.

A controller 20 cooperates with the radiation detectors 15a-15f to determine at least one property of the subterranean formation corrected for the stand-off distance based upon the detected radiation from the radiation detectors. More particularly, the controller 20 determines a correction factor that may be used to correct a porosity or the stand-off distance from the respective count rates. The controller 20 may also determine property of the subterranean formation corrected for the stand-off distance based upon an asymmetry of the detected radiation from the radiation detectors 15a-15f, as will be explained in further detail below.

The controller 20 may include a processor 21 and a memory 22 coupled thereto. Of course, the controller 20 may include more than one processor. The controller 20 may be remote from the borehole 12, carried within the borehole, or positioned outside the borehole above the subterranean formation 13, for example. Of course, the controller 20 may be positioned elsewhere or in more than one location so that its functionality is shared.

To correct for the stand-off, the controller 20 uses azimuthal information from the radiation detectors 15a-15f. For ease in explanation, reference is made to two radiation detectors 15b, 15e (FIG. 2). In general, if the housing 11 of the well-logging apparatus 10 touches the wall of the borehole 12, there is little or no stand-off for the radiation detector 15e adjacent or close to the subterranean formation 13. However, the radially opposite radiation detector 15b has a maximum stand-off for the given borehole size.

If the hydrogen index of the borehole 12 is larger than the hydrogen index of the subterranean formation 13, the radiation detector 15b with stand-off collects fewer counts than the radiation detector 15e with little or no stand-off. As mentioned above, the radiation detector 15b with the increased stand-off sees the borehole 12 together with the subterranean formation 13. The effective hydrogen index is higher in this case than the hydrogen index of the subterranean formation 13. The count rate of the radiation detector 15e with little or no stand-off is more than the count rate of the radiation detector 15b with the increased stand-off. Therefore, the asymmetry of the count rates of the radiation detectors 15a-15f can be used by the controller 20 as a variable that measures the stand-off.

Referring to the equation:

$$A(i) = \frac{n \text{Det}(i)}{\sum_{j=1}^{n} \text{Det}(j)}$$

Det(i) is the count rate of the $i^{th}$ detector, and n is the total number of detectors, which in the example described herein in six. The variable A(i) depends also on the borehole hydrogen index. If the housing 11 of the well-logging tool 10, for example, is centralized in the borehole 12, the count rates of the radiation detectors 15a-15f are the same, and the asymmetry=1 (assuming that the subterranean formation surrounding the borehole is uniform). If the hydrogen index of the borehole fluid is relatively small, then count rates do not depend strongly on the housing 11 position, and the asymmetry may be close to one.

Figure 5:
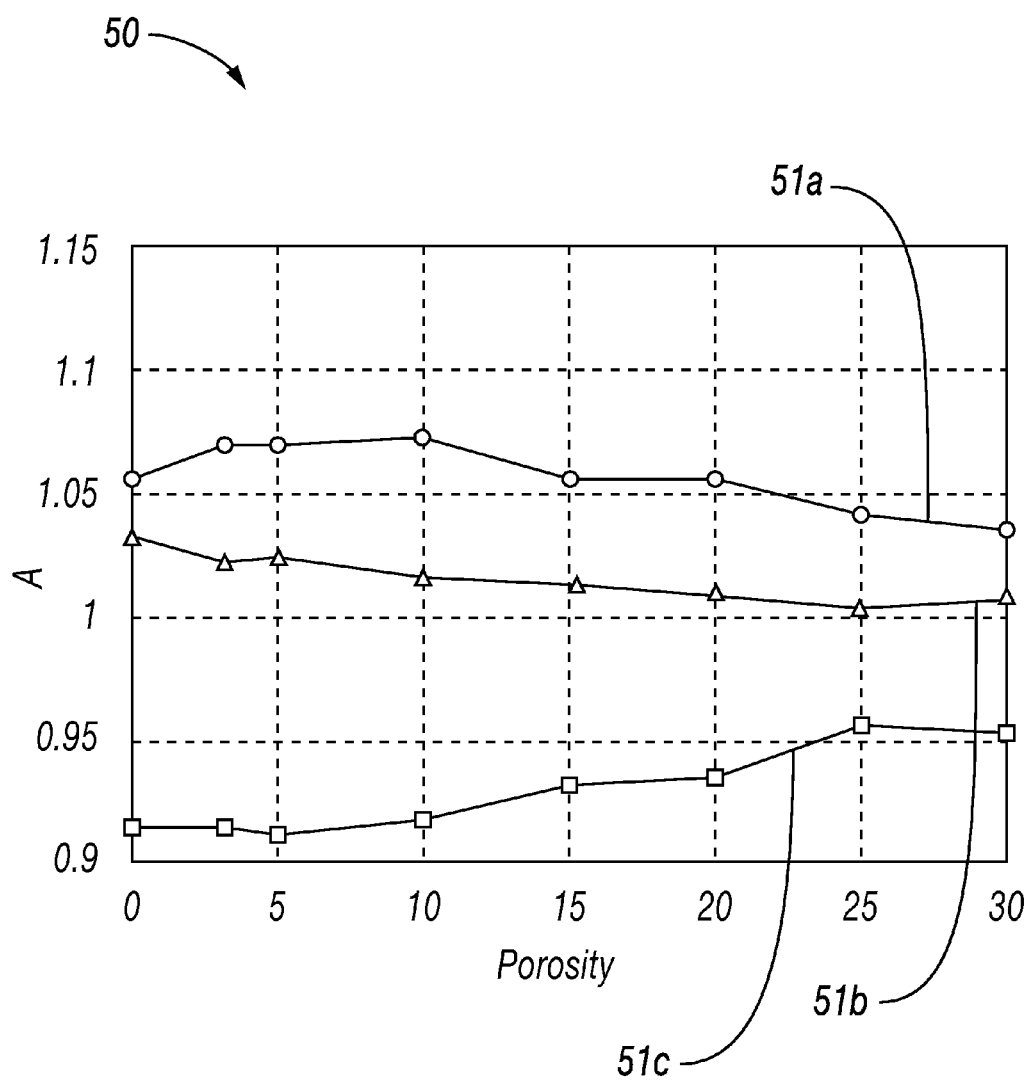
FIG. 5 is a graph of asymmetry versus porosity for a water-filled borehole.

Referring now additionally to the graph 50 in FIG. 5, the distribution of A versus porosity for a water-filled borehole illustrated. Curve 51a corresponds to no stand-off, while curve 51b corresponds to 0.4 inches of stand-off. Curve 51b corresponds to 0.85 inches of stand-off.

The asymmetry for radiation detectors with a maximum stand-off is less than one. Without stand-off the asymmetry is more than one. Likewise, asymmetry is relatively close to one for radiation detectors with a medium stand-off.

For a methane-filled borehole, the radiation detector count rate may not depend strongly on the stand-off, and the asymmetry may be close to one. Asymmetry represents the combined effects of borehole fluid and stand-off on each radiation detector count rate. By the controller 20 using the azimuthal information from the radiation detectors 15a-15f, the asymmetry in this particular case, the counts of each radiation detector may be corrected to derive a stand-off independent porosity.

Figure 6A:
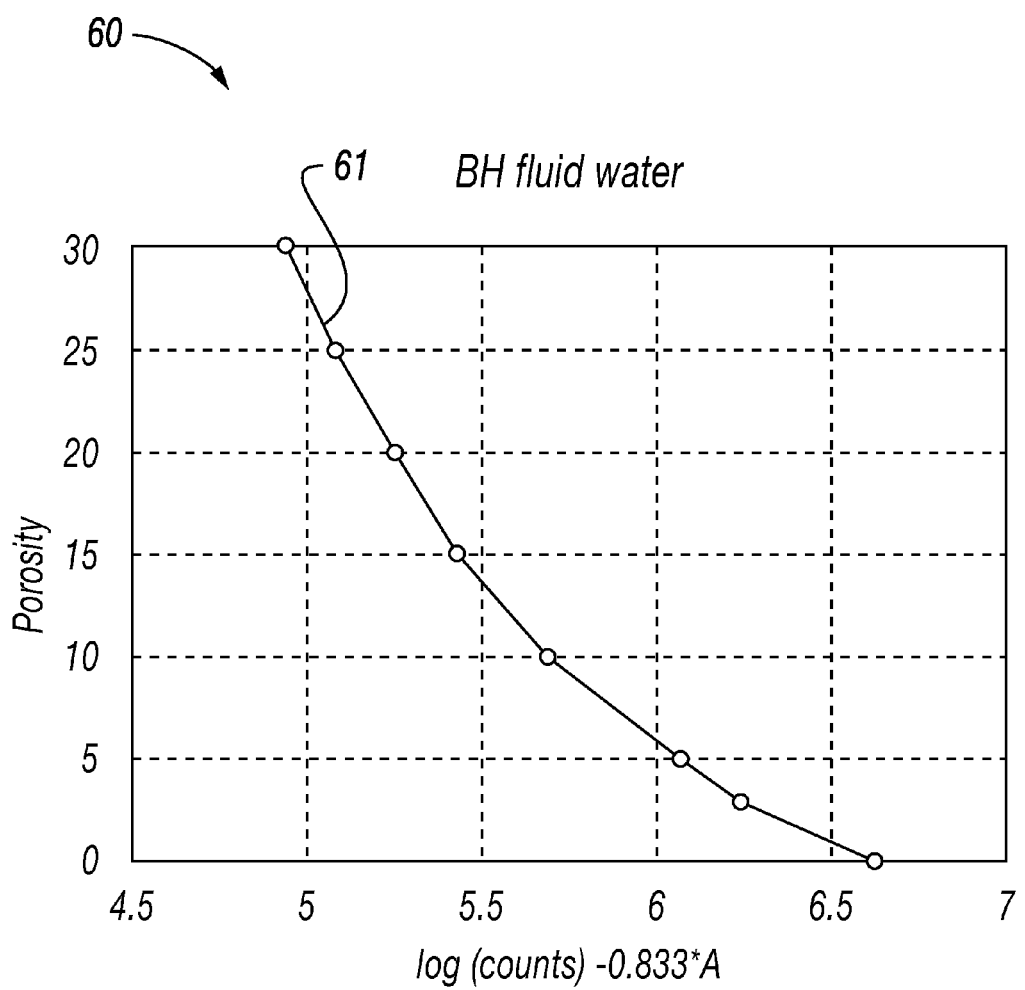
FIGS. 6a and 6b are graphs of porosity versus modified count rates for water-filled and methane-filled boreholes, respectively.
Figure 6B:
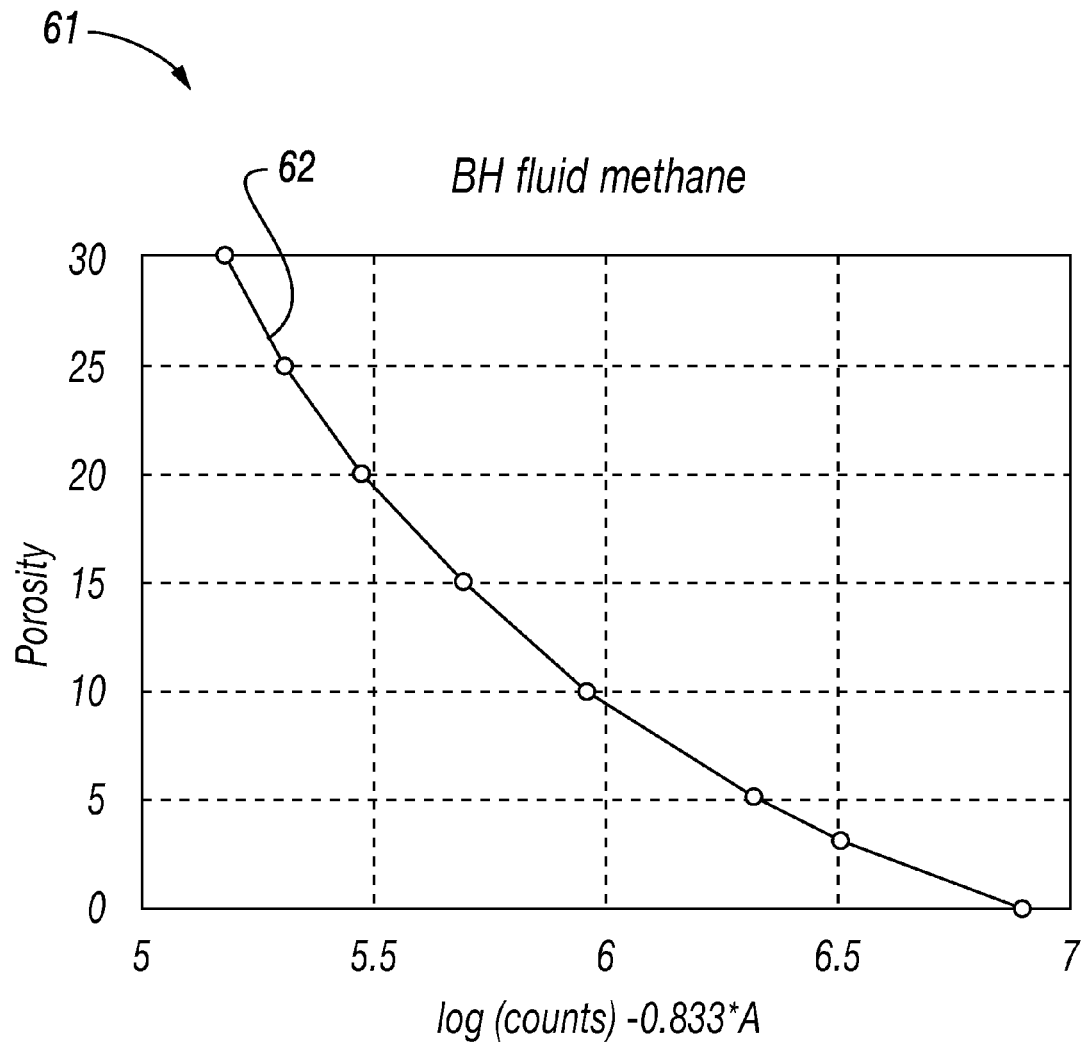

Referring to the graphs 60 and 61 in FIGS. 6a and 6b, respectively, the dependence of porosity on the combination of count rates and asymmetry for radiation detectors with different stand-offs for water-filled and methane-filled boreholes is illustrated. Using the asymmetry A for the count rate of each radiation detector, the porosity can be determined as a function of the corrected detector count rate and independent of the stand-off. The same combination corrects the stand-off for both borehole fluids. The curve 63 in the graph 60 of FIG. 6a illustrates the porosity dependence on the average counts of radiation detectors having no stand-off, 0.4 inches of stand-off, 0.85 inches of stand-off and the average stand-off. In addition to the individual radiation detectors, the curve 62 in the graph 61 of FIG. 6b illustrates the porosity dependence on the average counts of radiation detectors having no stand-off, 0.4 inches of stand-off, and 0.85 inches of stand-off, corrected with its corresponding asymmetry factor, which is close to one in this case. The average count rate and the individual radiation detector count rates after correction may agree.

In the examples illustrated in FIGS. 6a and 6b, the relationship between porosity and the uncorrected count rates of the different detectors (count$_{uncorr}$) becomes unique if each radiation detector count rate is corrected by the formula given below to determine the corrected count rate count$_{uncorr}$:

$$\log(\text{count}_{corr})=\log(\text{count}_{uncorr})-\alpha \cdot A$$

where is a factor determined from experiments or modeling. In the case of the example given in FIGS. 6a and 6b, =0.833. The value may vary depending on such parameters as tool diameter, detector geometry and spacing, and borehole diameter for example. The functional form of the relationship between the asymmetry and the stand-off correction may be different and more complex for other tool geometries.

Figure 7:
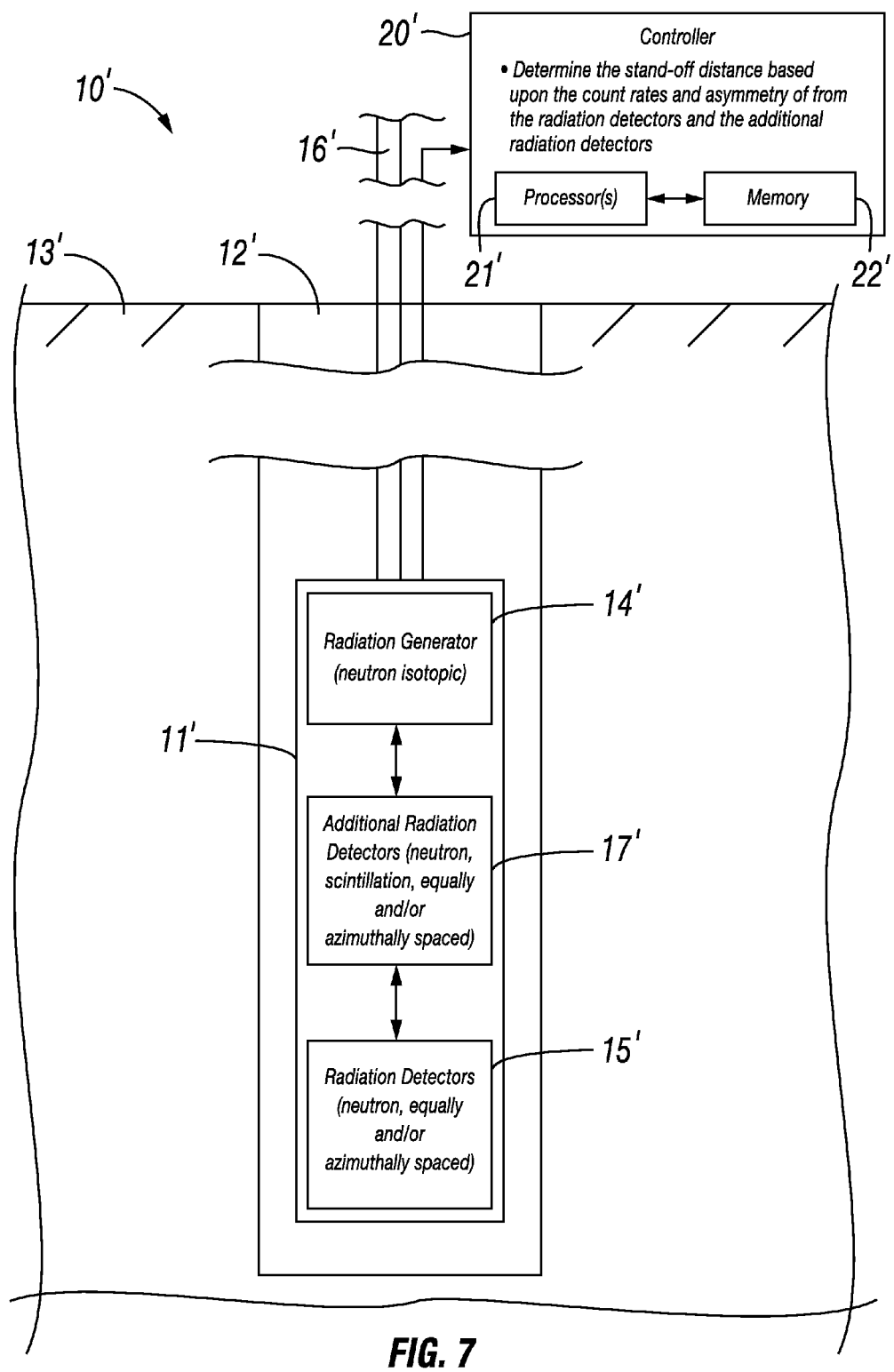
FIG. 7 is a schematic diagram of a portion of a well-logging apparatus in accordance with another embodiment.

Referring now to FIG. 7, in another embodiment of the well-logging tool 10', the azimuthally radiation detectors 15' are at a first axial spacing from the radiation source 14'. An additional set of radiation detectors 17' is carried by the housing 11' in azimuthally spaced relation and at a second axial spacing from the radiation source 14' to detect additional radiation from the subterranean formation 13'. The controller 20' determines the stand-off distance d also based upon the additional detected radiation from the additional radiation detectors 17'. Each of the additional radiation detectors 17' may be a scintillation detector, for example. The additional radiation detectors 17' may be gamma ray detectors and/or neutron detectors, or a combination thereof. In some embodiments, each of the additional radiation detectors 17' may be another type of detector. Moreover only one additional radiation detectors may be included. It should be noted that the additional radiation detectors 17' are azimuthally spaced similarly to radiation detectors 15' as illustrated above in FIG. 2, for example, however, the additional radiation detectors may not be azimuthally spaced and may be different in number from the radiation detectors 15'.

A method aspect is directed to determining a stand-off distance defined by a housing 11 of the well-logging apparatus 10, for example, as described above. The method includes directing radiation from a radiation source 14 carried by the housing 11 into the subterranean formation 13. The method also includes detecting radiation from the subterranean formation 13 using radiation detectors 15 carried by the housing 11 in azimuthally spaced relation. The method further includes using a controller 20 to determine the stand-off distance based upon the detected radiation from the radiation detectors 15.

The radiation detectors 15 generate a count rate, and the controller 20 is used to determine the stand-off distance from the count rates. The controller 20 is also used to determine the stand-off distance based upon an asymmetry of the detected radiation from the radiation detectors 15.

In another method embodiment, the radiation detectors 15 are at a first axial spacing from the radiation source 14. The method includes detecting radiation from the subterranean formation 13 using an additional set of radiation detectors 17, for example, as described above, carried by the housing 11 in azimuthally spaced relation and at a second axial spacing from the radiation source 14. The controller 20 is used to determine the stand-off distance also based upon the additional detected radiation from the additional radiation detectors 17.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A well-logging apparatus comprising:
a housing to be positioned within a larger borehole of a subterranean formation and thereby define a stand-off distance with respect to the larger borehole;
at least one radiation source carried by said housing to direct radiation into the subterranean formation;
a plurality of radiation detectors carried by said housing in azimuthally spaced relation to detect radiation from the subterranean formation, wherein each of the plurality of radiation detectors is configured to detect substantially the same type of radiation; and
a controller to cooperate with said plurality of radiation detectors to determine at least one property of the subterranean formation corrected for the stand-off distance based on an asymmetry indicated by differences in the radiation detected by different of the plurality of radiation detectors.

2. The well-logging apparatus of claim 1, wherein each of said plurality of radiation detectors is to generate a count rate; and wherein said controller is to determine the at least one property from an asymmetry indicated by differences among the count rates.

3. The well-logging apparatus of claim 2, wherein said controller is to determine the asymmetry in accordance with the following relationship:

$$A(i) = \frac{n\text{Det}(i)}{\sum_{j=1}^{n} \text{Det}(j)}$$

where Det(i) represents a count rate of an $i^{th}$ radiation detector of the plurality of radiation detectors, n represents total number of radiation detectors, and A(i) represents the asymmetry of the radiation detected by the $i^{th}$ radiation detector.

4. The well-logging apparatus of claim 1, wherein said plurality of radiation detectors are equally azimuthally spaced from one another.

5. The well-logging apparatus of claim 1, wherein said plurality of radiation detectors are at a first axial spacing from said at least one radiation source; and comprising at least one additional radiation detector carried by said housing in azimuthally spaced relation and at a second axial spacing from said at least one radiation source to detect additional radiation from the subterranean formation; and wherein said controller is to determine the at least one property of the subterranean formation corrected for the stand-off distance also based upon the additional detected radiation from said at least one additional radiation detector.

6. The well-logging apparatus of claim 5, wherein said at least one additional radiation detectors comprises a scintillation detector.

7. The well-logging apparatus of claim 3, wherein the controller is configured to determine the at least one property using one or more corrected count rates including a first corrected count rate from a first of the plurality of radiation detectors, wherein the first corrected count rate is obtained in accordance with the following relationship:

$$\log(\text{count}_{corr})=\log(\text{count}_{uncorr})-\alpha \cdot A$$

where $count_{uncorr}$ represents a first count rate from a first of the plurality of radiation detectors before correction, $count_{corr}$ represents the first corrected count rate from the first of the plurality of radiation detectors, α represents a factor determined from experiments or modeling, and A represents the asymmetry associated with radiation detected from the first of the plurality of radiation detectors.

8. The well-logging apparatus of claim 2, wherein the controller is configured to determine the at least one property using one or more corrected count rates including a first corrected count rate from a first of the plurality of radiation detectors, wherein the first corrected count rate is obtained based on a relationship involving: a first count rate from a first of the plurality of radiation detectors before correction, the asymmetry associated with radiation detected from the first of the plurality of radiation detectors, and an asymmetry proportionality factor determined from experiments or modeling.

9. The well-logging apparatus of claim 1, wherein each of said plurality of azimuthally spaced radiation detectors comprises a neutron detector.

10. A well-logging apparatus comprising:
a housing to be positioned within a larger borehole of a subterranean formation and thereby define a stand-off distance with respect to the larger borehole;
at least one neutron generator carried by said housing to direct radiation into the subterranean formation;
a plurality of neutron detectors carried by said housing in azimuthally spaced relation to detect radiation from the subterranean formation and generate a corresponding plurality of count rates; and
a controller cooperating with said plurality of neutron detectors to determine at least one property of the subterranean formation corrected for the stand-off distance from the count rates by determining an asymmetry of the count rates of the plurality of neutron detectors, using the asymmetry of the count rates and at least one of the count rates to obtain at least one corrected count rate, and using the at least one corrected count rate to determine the at least one property of the subterranean formation.

11. The well-logging apparatus of claim 10, wherein said controller is to determine the at least one property also based upon an asymmetry of the detected radiation from said plurality of neutron detectors.

12. The well-logging apparatus of claim 10, wherein said plurality of neutron detectors are equally azimuthally spaced from one another.

13. The well-logging apparatus of claim 10, wherein said plurality of neutron detectors are at a first axial spacing from said at least one neutron generator; and comprising at least one additional radiation detector carried by said housing in azimuthally spaced relation and at a second axial spacing from said at least one neutron generator to detect additional radiation from the subterranean formation; and wherein said controller is to determine the at least one property of the subterranean formation corrected for the stand-off distance also based upon the additional detected radiation from said at least one additional radiation detector.

14. The well-logging apparatus of claim 13, wherein each of said plurality of additional radiation detectors comprises a scintillation detector.

15. A method of correcting for a stand-off distance defined by a housing to be positioned within a larger borehole of a subterranean formation, the stand-off distance being define with respect to the larger borehole, the method comprising:
directing radiation from at least one radiation source carried by the housing into the subterranean formation;
detecting respective count rates of radiation from the subterranean formation using a plurality of radiation detectors carried by the housing in azimuthally spaced relation, wherein each of the radiation detectors is configured to detect substantially the same count rate when the housing is centralized in the borehole and to detect different count rates when the housing is not centralized in the borehole; and
using a controller to cooperate with the plurality of radiation detectors and determine at least one property of the subterranean formation corrected for the stand-off distance based upon the detected radiation from the plurality of radiation detectors.

16. The method of claim 15, wherein each of the plurality of radiation detectors generates a count rate; and wherein the controller is used to determine the at least one property from the count rates.

17. The method of claim 15, wherein the controller is used to determine the at least one property based upon an asymmetry of the detected radiation from the plurality of radiation detectors.

18. The method of claim 15, wherein the plurality of radiation detectors are equally azimuthally spaced from one another.

19. The method of claim 15, wherein the plurality of radiation detectors are at a first axial spacing from the at least one radiation source; and comprising detecting radiation from the subterranean formation using at least one additional radiation detector carried by the housing at a second axial spacing from the at least one radiation source; and wherein the controller is used to determine the at least one property of the subterranean formation corrected for the stand-off distance also based upon the additional detected radiation from the additional radiation detector.

20. The method of claim 19, wherein the additional radiation detector comprises a scintillation detector.

21. The method of claim 15, wherein the at least one radiation source comprises a neutron generator.

22. The method of claim 15, wherein the at least one radiation source comprises a radioisotopic radiation source.

23. The method of claim 15, wherein each of the plurality of azimuthally spaced radiation detectors comprises a neutron detector.

* * * * *